Jan. 9, 1945. A. Y. DODGE 2,366,841
COUPLING
Filed April 3, 1942 2 Sheets-Sheet 1
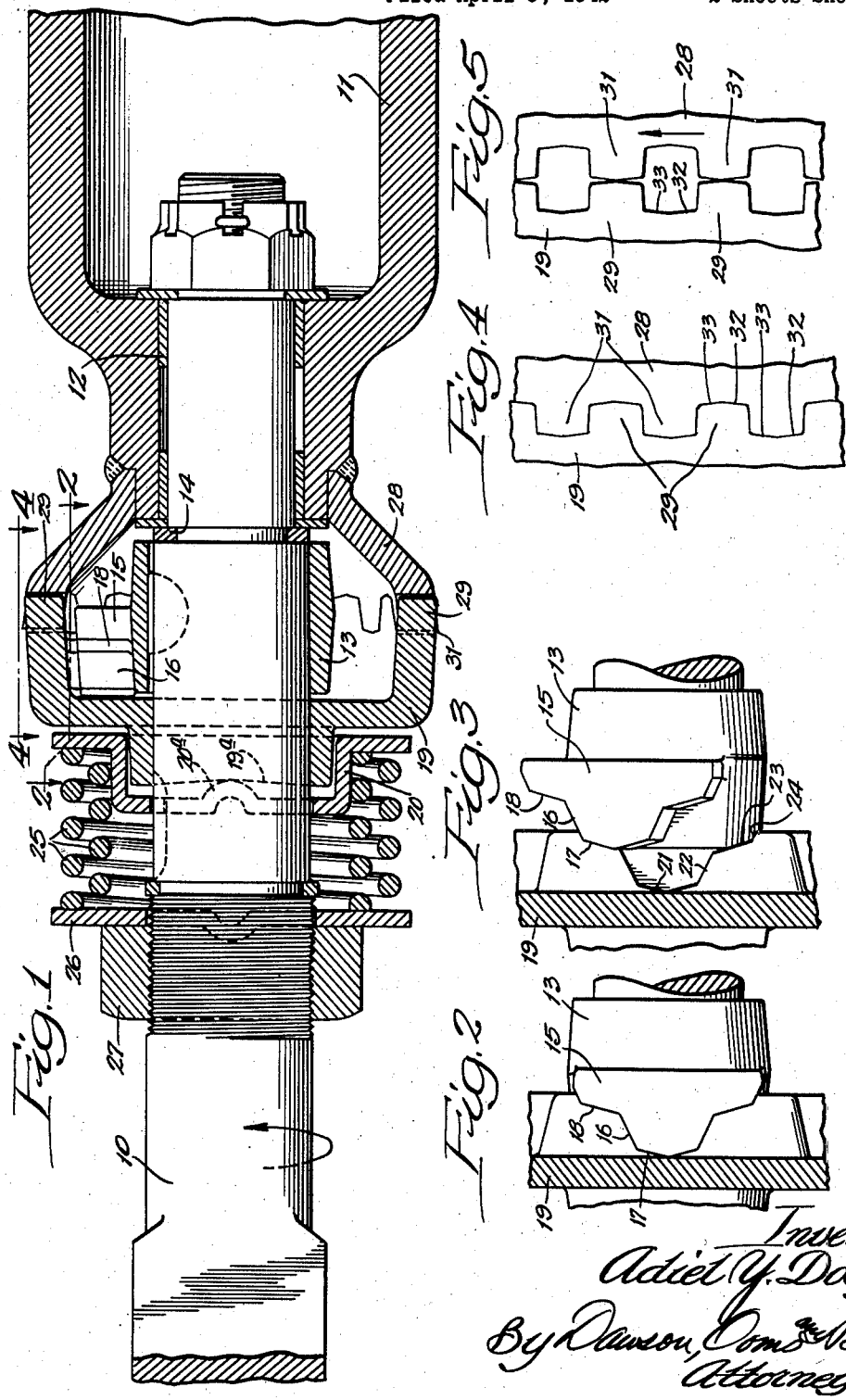
Inventor:
Adiel Y. Dodge,
By Dawson, Ooms & Booth
Attorneys.

Jan. 9, 1945. A. Y. DODGE 2,366,841
COUPLING
Filed April 3, 1942 2 Sheets-Sheet 2
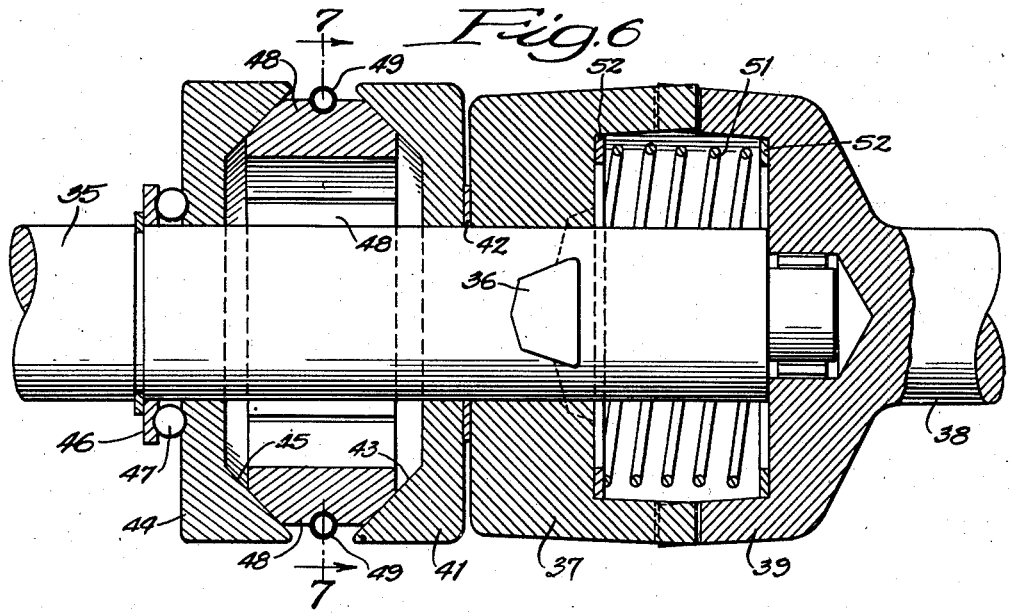
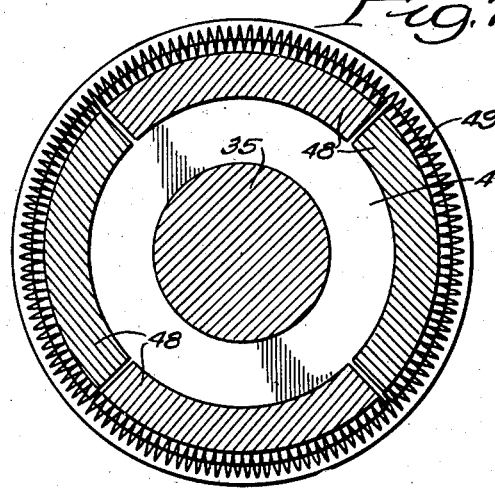
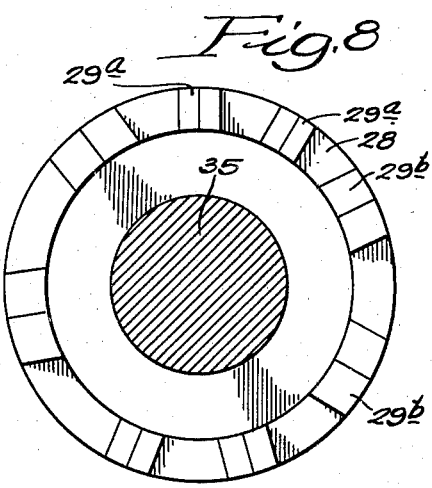
Inventor:
Adiel Y. Dodge,
By Dawson, Ooms & Birth
Attorneys.

Patented Jan. 9, 1945

2,366,841

UNITED STATES PATENT OFFICE 2,366,841

COUPLING

Adiel Y. Dodge, Rockford, Ill.

Application April 3, 1942, Serial No. 437,483

4 Claims. (Cl. 64—29)

This invention relates to torque transmitting couplings and more particularly to torque transmitting couplings which will disengage when the torque load reaches or exceeds a predetermined value.

Couplings have heretofore been proposed to release upon a predetermined torque load. Such couplings, however, tend to wear out rapidly while slipping under overload conditions or require manual resetting upon removal of the overload. It is accordingly one of the objects of the present invention to provide a coupling overcoming these objections.

Another object of the invention is to provide a coupling which, when released, has a very light torque drag to minimize wear on the parts during slipping.

Another object of the invention is to provide a coupling which will automatically re-engage upon the removal of the torque overload and subsequent synchronization of the parts.

A further object of the invention is to provide a coupling including a torque responsive cam mechanism operating to release a clutch. According to one feature, the clutch is of a positive type which will not re-engage until the speed of its parts is synchronized.

Still another object of the invention is to provide a coupling which is responsive to both torque and speed so that it will release under different torque loads at different speeds.

The above and other objects and advantages of the invention will be apparent from the following description when read in connection with the accompanying drawings, in which—

Figure 1 is an axial section of a coupling embodying the invention;

Figures 2 and 3 are partial views on the line 2—2 of Figure 1 showing the cam mechanism in different positions;

Figures 4 and 5 are partial views on the line 4—4 of Figure 1 showing the clutch mechanism in different positions;

Figure 6 is an axial section of another form of coupling embodying the invention;

Figure 7 is a section on the line 7—7 of Figure 6; and

Figure 8 is a front elevation of one of the clutch members.

The coupling shown in Figures 1 to 5 is adapted to transmit torque between two shafts 10 and 11 either of which may be the driving shaft. The coupling as shown can transmit torque equally well in either direction although it will be apparent that if transmission in one direction only is desired, suitable modifications of the mechansm could be made.

The shaft 10 is shown journalled in one end of the shaft 11 by bearings 12 and has keyed or otherwise rigidly secured thereto a collar 13 held against longitudinal movement on the shaft by a ring 14 fitting in a groove in the shaft. At one or more points throughout its circumference the collar 13 is formed with a cam projection 15 having connected cam surfaces 16 and 17 lying at different angles to the axis of the shaft 10 and the collar. As shown, the surface 16 forms an angle of approximately 26½° with the axis, while the surface 17 forms an angle of approximately 15° with the axis. The projection 15 also includes a cam portion 18 having the same angle as the cam surface 17.

A sleeve member 19 is slidably and rotatably mounted on the shaft 10 and is formed on its inner surface with cam depressions complementary to the shape of the cam 15. As best seen in Figures 2 and 3, the sleeve member is formed with a cam surface 21 adapted to fit against the surface 17, a surface 22 adapted to fit against the surface 16 and a surface 23 adapted to fit against either of the surfaces 17 or 18, depending upon the position of the parts. A small shoulder 24 at the end of the surface 23 serves to engage the cam surface 16 to prevent further relative rotation of the cam parts as will be described hereinafter.

The sleeve member 19 is urged to the right as seen in Figure 1 to move the cam parts into engaged position shown in Figure 2 by springs 25 engaging a fixed abutment 26 on the shaft 10. As shown, the abutment may be adjusted by a nut 27, screw threaded on the shaft to vary the torque load at which the coupling will release. The opposite end of the springs abut against a collar 20 slidably keyed to the driving shaft 10 and having a pair of projections 20ª thereon riding against the end of the sleeve member 19. As shown in Figure 1, the sleeve member 19 may be shaped at its ends as shown at 19ª to provide cam surfaces against which the projections 20ª rest. The angles of the surfaces 19ª are relatively small and in the normal position of the parts the projections 20ª rest in the most depressed portion in the end of the sleeve member. When, however, the sleeve member is turned out of engagement by operation of the cam mechanism, the projections 20ª ride up on the surfaces 19ª to create a tendency to turn the sleeve member back into the engaged position in response to spring pressure. Thus the cam action produced by parts 19ª and 20ª tends to reduce the frictional effect between these parts so that they will turn more freely when the clutch parts are moving toward their engaged position.

The sleeve member 19 is adapted to be connected to a cooperating angular flange 28 connected to the driven shaft 11 by means of a clutch. As shown, the clutch is of the positive tooth type, comprising a series of teeth 29 on the sleeve member 19 and a series of cooperating teeth 31 on the flange 28. The teeth, as shown, are formed with substantially straight sides which may have a slight angle with the axis, preferably an angle whose tangent is less than the coefficient of friction, to facilitate manufacture. This angle is insufficient to cause the teeth to move apart under load so that a positive connection is provided. The ends of the teeth are formed with an ejection angle so that, when they are rotating relatively, they cannot move into engagement. As shown in Figures 4 and 5, each tooth is formed with a double ejection angle as indicated at 32 and 33 so that the teeth will reject each other regardless of the direction of relative rotation. If relative rotation in only one direction is to be accounted for, a single ejection angle on the teeth may be employed.

In operation, the parts are normally in the engaged position shown in Figures 1, 2, and 4. In this position torque will flow from the shaft 10 through the cam members 15 through the surfaces 16 and 22, to the collar 19 and then through the clutch 29—31 to the driven flange 28 and the shaft 11. As long as the torque is below the value for which the coupling is adjusted, this condition will continue and torque will be transmitted positively from one shaft to the other.

When the torque exceeds a predetermined value fixed by the loading of the spring 25 and the angle of the cam surfaces 16 and 22, the sleeve member 19 will be cammed to the left against the springs until the parts reach the position shown in Figures 3 and 5. In this position the cam surface 16 engages the shoulder 24 to limit further rotation between parts 15 and 19 and the cam surfaces 17 and 23 are in active engagement. At the same time, the clutch teeth 29 and 31 have been moved out of engagement to interrupt the torque flow. Due to the fact that cam surfaces 17 and 23 form a relatively large angle with the axis of the shaft 10, the axial component of the spring pressure will be quite small so that the teeth 29 and 31 will be urged into engagement with a light pressure. Due to the ejection angle on the ends of these teeth, they cannot engage as long as there is appreciable relative rotation between them and since the pressure urging them into engagement is quite small there will be very little wear on the ends of the teeth.

When the overload condition has been removed and the shafts 10 and 11 are again synchronized, either by stopping both of them or by bringing them both to the same speed, the springs 25 will move the sleeve member 19 to the right to re-engage the clutch teeth 29 and 31, the angle of the cam surfaces 17 and 23 having a tangent greater than the coefficient of friction to permit this operation.

Thus the coupling of the present invention provides a positive release upon a predetermined torque load and a very light slipping load after the coupling has released. Furthermore, upon removal of the overload condition and synchronization of the driving and driven shafts, the coupling will automatically re-engage without requiring any manual resetting.

Figures 6 and 7 illustrate another embodiment of the invention which introduces a speed factor in addition to the torque factor. As shown, the driving shaft 35 carries one or more cam projections 36 substantially similar to the projections 15 of the first embodiment which cooperate with cam sockets in a sleeve member 37 which is freely rotatable on the driving shaft. A driven shaft 38 is formed with a flange 39, the sleeve member 37 and flange 39 having cooperating clutch teeth of the type more particularly shown in Figures 4 and 5.

The sleeve member 37 is urged to the right to engage the clutch teeth by means of a speed responsive mechanism including a collar 41 bearing against a sleeve member through a bearing washer 42 and formed on one side with outwardly converging cam surface 43. A similar sleeve member 44 having a cam surface 45 complementary to the cam surface 43 is held against axial movement on the shaft by means of a sleeve 46 engaging the sleeve member 44 through bearing balls 47.

Between the sleeve members 44 and 41 are loosely mounted a plurality of centrifugal weights 48 shaped on their outer edges to cooperate with the cam surfaces 43 and 45 and normally urged inwardly by a light garter spring 49. The weights 48 tend to move outwardly in response to centrifugal force to cam the collar 41 and the sleeve member 37 to the right to engage the clutch teeth.

A light spring 51 is arranged between the sleeve member 37 and the flange 39 engaging the same through washers 52 to provide a light friction drag between the parts when the clutch teeth are disengaged. The primary purpose of this spring is to provide a light friction drag when the clutch is disengaged and its axial thrust on the sleeve 37 is insufficient to disengage the clutch when it is stationary.

The normal driving position of the parts is shown in Figure 6 with the clutch teeth engaged and with the cam projection 36 fitting into its socket the weights 48 will tend to cam the collar 41 and the sleeve member 37 toward engaged position with a force which is a function of the speed of rotation of the driving shaft 35 so that a higher degree of torque will be required at high speeds to cam the sleeve member 37 to the left than is required at low speeds. As the sleeve member moves to the left, the spring 51 will exert a light friction drag on it tending to rotate it with the driven shaft so that the cam 36 will be held out of its socket and the clutch teeth will be held out of engagement. This spring is preferably so arranged that during disengagement it is wound up slightly and when the parts are again synchronized, the spring tending to unwind tends to move the cam projection 36 back into register with its socket so that the spring does not interfere with reengagement with the clutch teeth.

Another feature of the invention which may be employed with either of the forms shown, is illustrated in Figure 8 in connection with the clutch flange 28 of Figure 1. In operation of the coupling units, if the clutch teeth are evenly spaced so that they may engage in a number of different positions the drag between the two clutch parts will be relatively high and there may be a slight cracking noise as the two clutch members pass through each of the positions in which they might engage. The drag may be reduced and the cracking noise may be reduced to one minor crack per revolution by irregularly spacing the teeth as shown in Figure 8. In this construction the clutch member includes a number of relatively small clutch teeth 29ª and a number of larger clutch teeth 29ᵇ irregularly grouped around the flange of the clutch member. The mating clutch part has complementary teeth so that the clutch can engage in only one position. This construction reduces the drag between the clutch parts as well as minimizing the cracking noise which occurs when the clutch teeth pass a position in which they can engage.

While one particular cam construction and one particular type of clutch have been illustrated, it will be understood that various changes could be made in these parts and that the particular form shown on the drawings is for the purpose of illustration only. Reference will, therefore, be had to the claims to determine the scope of the invention.

What is claimed is:

1. A coupling for connecting a driving shaft to a driven shaft comprising a cam device arranged to transmit torque between the shafts and including parts connected by cam surfaces to be moved axially relative to each other in response to torque, yielding means urging said parts axially together, clutch means including engaging members in series with the cam device to transmit torque between the shafts, one of the clutch members being connected to one of the cam device parts to be moved thereby in a direction to disengage the clutch means, and resilient means engaging the clutch members to impose a friction drag thereon when the clutch members are disengaged.

2. A coupling for connecting a driving shaft to a driven shaft comprising a cam device arranged to transmit torque between the shafts and including parts connected by cam surfaces to be moved axially relative to each other in response to torque, yielding means urging said parts axially together, clutch means including engaging members in series with the cam device to transmit torque between the shafts, one of the clutch members being connected to one of the cam device parts to be moved thereby in a direction to disengage the clutch means, and a coil spring coaxial with the clutch members and frictionally engaging them at its opposite ends so that the spring will be torsionally wound when the clutch members are rotated relatively during disengagement.

3. A coupling for connecting a driving shaft to a driven shaft comprising a clutch and cam device arranged in series in torque transmitting relationship with the shafts, the cam device being connected to the clutch to move it out of engagement in response to a given torque and comprising axially movable parts formed with successive cooperating cam surfaces arranged at different angles, yielding means urging said parts together, one of said cam surfaces being at an angle to urge the parts axially apart in response to said torque, the other of said cam surfaces being at an angle to permit the yielding means to urge the parts together under a lesser torque.

4. A coupling for connecting a driving shaft to a driven shaft comprising a clutch and cam device arranged in series in torque transmitting relationship with the shafts, the cam device being connected to the clutch to move it out of engagement in response to a given torque and comprising axially movable parts formed with successive cooperating cam surfaces arranged at different angles, yielding means urging said parts together, the cam surfaces forming the lesser angle with the shaft axis cooperating to move the parts axially apart in response to said torque, the cam surfaces forming the greater angle with the shaft axis cooperating to permit the yielding means to urge the parts together under a lesser torque.

ADIEL Y. DODGE.